(12) United States Patent
Robertson et al.

(10) Patent No.: US 8,244,941 B2
(45) Date of Patent: Aug. 14, 2012

(54) REAL TIME DATA INTERFACE

(75) Inventors: James Robertson, Bradford, MA (US);
Al Strelzoff, Boxford, MA (US); **Ed
Szczesuil, Seabrook, NH (US); Jay
Ward**, Stratham, NH (US)

(73) Assignee: E-Trolz, Inc., North Andover, MA (US)

( * ) Notice: Subject to any disclaimer, the term of this
patent is extended or adjusted under 35
U.S.C. 154(b) by 60 days.

(21) Appl. No.: 12/468,550

(22) Filed: May 19, 2009

(65) Prior Publication Data

US 2009/0287863 A1 Nov. 19, 2009

Related U.S. Application Data

(60) Provisional application No. 61/128,101, filed on May 19, 2008.

(51) Int. Cl.
*G06F 13/12* (2006.01)
(52) U.S. Cl. .............. 710/72; 710/58; 710/60; 710/62
(58) Field of Classification Search .................. None
See application file for complete search history.

(56) References Cited

U.S. PATENT DOCUMENTS

| | | | |
|---|---|---|---|
| 5,390,351 A * | 2/1995 | Di Giulio et al. ............. 709/225 |
| 5,442,344 A * | 8/1995 | Merkle et al. .................... 705/22 |
| 2004/0141576 A1* | 7/2004 | Sonoda ......................... 375/372 |
| 2004/0215078 A1* | 10/2004 | Yamauchi ...................... 600/450 |
| 2005/0015523 A1* | 1/2005 | Ishida et al. ..................... 710/52 |
| 2005/0268019 A1* | 12/2005 | Chang Chien et al. ........ 710/305 |
| 2006/0064673 A1* | 3/2006 | Rogers et al. .................. 717/113 |
| 2006/0212132 A1* | 9/2006 | Vothknecht et al. .............. 700/1 |
| 2008/0114910 A1* | 5/2008 | He et al. .......................... 710/52 |
| 2009/0185513 A1* | 7/2009 | Fleischman .................... 370/310 |

OTHER PUBLICATIONS

Christini, David J., Approaches for Real-Time Computing in Biomedical Experiments, IEEE, p. 1.*

* cited by examiner

*Primary Examiner* — Eron J Sorrell

(74) *Attorney, Agent, or Firm* — McCarter & English, LLP

(57) ABSTRACT

The present invention relates to a device, system and method for controlling a data acquisition device and inserting the acquired data into the memory of an electronic device with minimal buffering of the data. An interface device, separate from the electronic device and capable of highly accurate timing, controls a data acquisition device. This interface device provides an interface between real time data and non real time operating system running on the electronic device. By sending data to a non-real time system in a near real-time manner, the non-real time system can continue the processing of the data either in near real time, or it can store the data for later processing.

18 Claims, 6 Drawing Sheets

REAL TIME DATA INTERFACE

RELATED APPLICATIONS

The present application claims priority to U.S. Provisional Patent Application Ser. No. 61/128,101 filed May 19, 2008, entitled "Real Time Data Interface," which is incorporated herein by reference.

BACKGROUND

Electronic devices such as controllers often run a conventional operating system ("OS"), such as Windows® or Linux®, or a multitasking or multithreading OS. In some cases, electronic devices may be used to model a set of computations being performed, or process a set of data, on a single computational element. However, the scheduling associated with this behavior introduces a considerable degree of uncertainty in the response time when measuring or capturing external stimuli in real-time.

A real-time data acquisition system conforms to very precisely timed behavior. In general, data samples are taken of some external signal at precisely timed intervals. Data may be transmitted between devices in units, such as individual samples of data, "words" or "records" consisting of multiple units of samples (for example, one sample for each channel of a data acquisition device at a single point in time), frames or blocks of data consisting of multiple words or records, or packets of data consisting of multiple frames. One having ordinary skill in the art will recognize that data may be sent in units of other sizes and configurations as well.

When a real time data acquisition system is used in conjunction with a conventional non-real time OS, a boundary exists between the real-time nature of the data acquisition system and the non-real time nature of the OS. That is, data is collected in real-time, but processed in non-real time, for example in a task-oriented device. The point at which a unit of data transitions from a real-time environment to a non-real time environment constitutes a boundary. The acquired data must cross this boundary, but as the data crosses the boundary, several problems may occur. For example, data may be lost, delayed, or be placed out-of-sequence as it crosses the boundary. Such a boundary 102 is depicted in FIG. 1 and will be described in more detail below.

One conventional methodology associated with real-time data acquisition and processing utilizes a custom-designed and application-specific real-time system for both data acquisition and processing. In this methodology, a custom-designed real-time information management system is generally employed. A real-time data acquisition device streams data to the real-time information management system; thus, there is no real-time/non-real-time boundary to cross. A drawback to this approach is that such a system is designed for a specific application, and is not suited to other applications or another data acquisition device. For example, a custom-built real-time information management system for a conventional Electroencephalography (EEG) device may only be suited to process EEG signals, and may not be suited to another application. Therefore, this methodology describes a point solution, and not a general-purpose system.

A second methodology, depicted in FIG. 1, provides for some flexibility in the way the system is employed. In this system, data acquisition device 110 acquires data in real time. A general-purpose non-real time OS 132 is stored in memory 130 of computing device 160. The OS requests data 120 from the data acquisition device 110, and the data acquisition device provides the requested data 170. The processor 140 processes the data 170 and may render it on a display 150.

However, this solution has several drawbacks as well. For example, because the non-real time OS requests data from the acquisition device 110, and because the OS is a task-oriented rather than a real-time system, some of the data acquired by the acquisition device 110 may not be requested, and may therefore not be sent or may be sent in a delayed fashion. This problem may be compounded by the fact that the OS must share the limited resources of the computing system 100 among several tasks, including processing, saving, and displaying the data. If the processor 140 is busy on other tasks, or if processing one unit of the acquired data takes longer than expected, then the OS may be delayed from requesting 120 the next unit of data. Systems like this do not operate in real time, but rather with a delay. As a result of these problems, systems such as the one depicted in FIG. 1 are prone to issues of data integrity, to delay in reporting and displaying data acquired in real time, and lack determinism.

Another problem associated with data acquisition and processing systems is known as "jitter." Jitter is a time variation of a characteristic in a signal, and is sometimes referred to as noise. Jitter is an undesirable factor in signal processing because it may reduce the accuracy of a result; however, jitter is unavoidable in many cases.

Thus, there is a need for general purpose system that is capable of acquiring data in a real-time manner and subsequently streaming the data across the boundary between the real-time device and a non-real time device, and to do so for an arbitrary amount of time. Further, the system can operate with determinism and without introducing data integrity issues into the data stream and reduce the errors associated with jitter.

SUMMARY

The present invention relates to a device, system and method for controlling a real time data acquisition device and managing the acquired data using a non-real time OS. The structures, functions, and operations taught herein may at least store the data in memory associated with a controller with minimal buffering, particularly at the data acquisition device.

In one embodiment, a data acquisition device is provided for acquiring data, and an electronic device is provided for processing the data. An interface device, separate from the electronic device for processing the data and capable of highly accurate timing, controls the data acquisition device. This interface device provides an interface between real time data acquisition and non-real time processing. By sending data to an electronic device in a near real-time manner, the electronic device can continue the processing of the data either in near real time, or it can store the data for later processing. This later processing can be done with varying degrees of sophistication without concern for the real time arrival of the data from the data acquisition device.

In another embodiment, the interface device is capable of operating independently from the electronic device for processing and its OS. The interface device may be programmable or configurable. According to another embodiment, the interface device can be configured or controlled, or both, by the electronic device with which it is interfaced.

According to another embodiment, the interface device implements interface augmentation to improve the deterministic means and speed of acquisition.

According to another embodiment, the interface device is part of a Field Programmable Gate Array. According to yet another embodiment, the system can be included in a controller architecture as an intelligent real time data peripheral controller.

DETAILED DESCRIPTION

The following description teaches illustrative embodiments of the present invention. Those skilled in the art will recognize that other embodiments are possible without deviating from the scope of the present disclosure.

In an illustrative embodiment, an interface device capable of highly accurate timing controls a data acquisition device and provides an interface between a real time data acquisition device and an electronic device operating with a non-real-time OS for processing the data.

Figure 1:
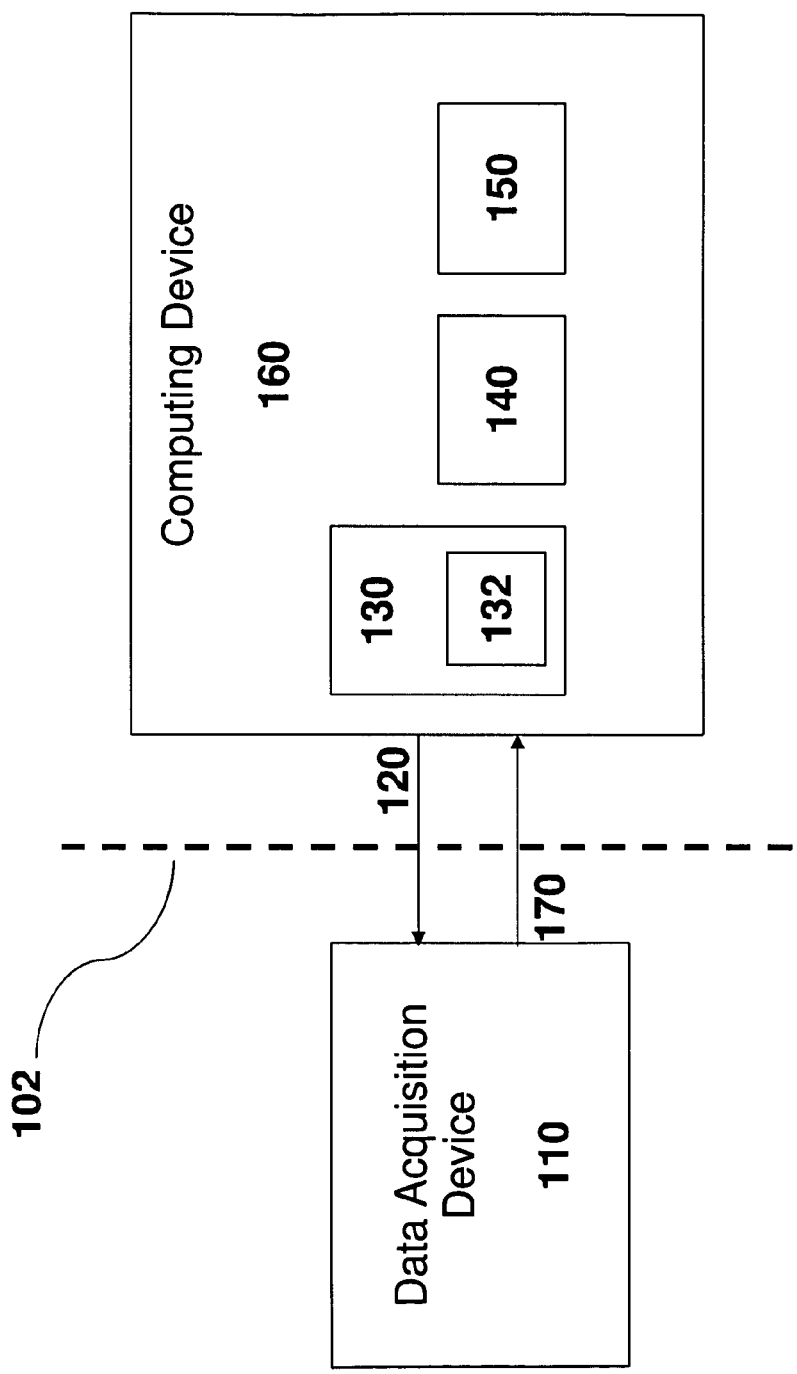
FIG. 1 depicts a conventional real time data acquisition device and controller.
Figure 2:
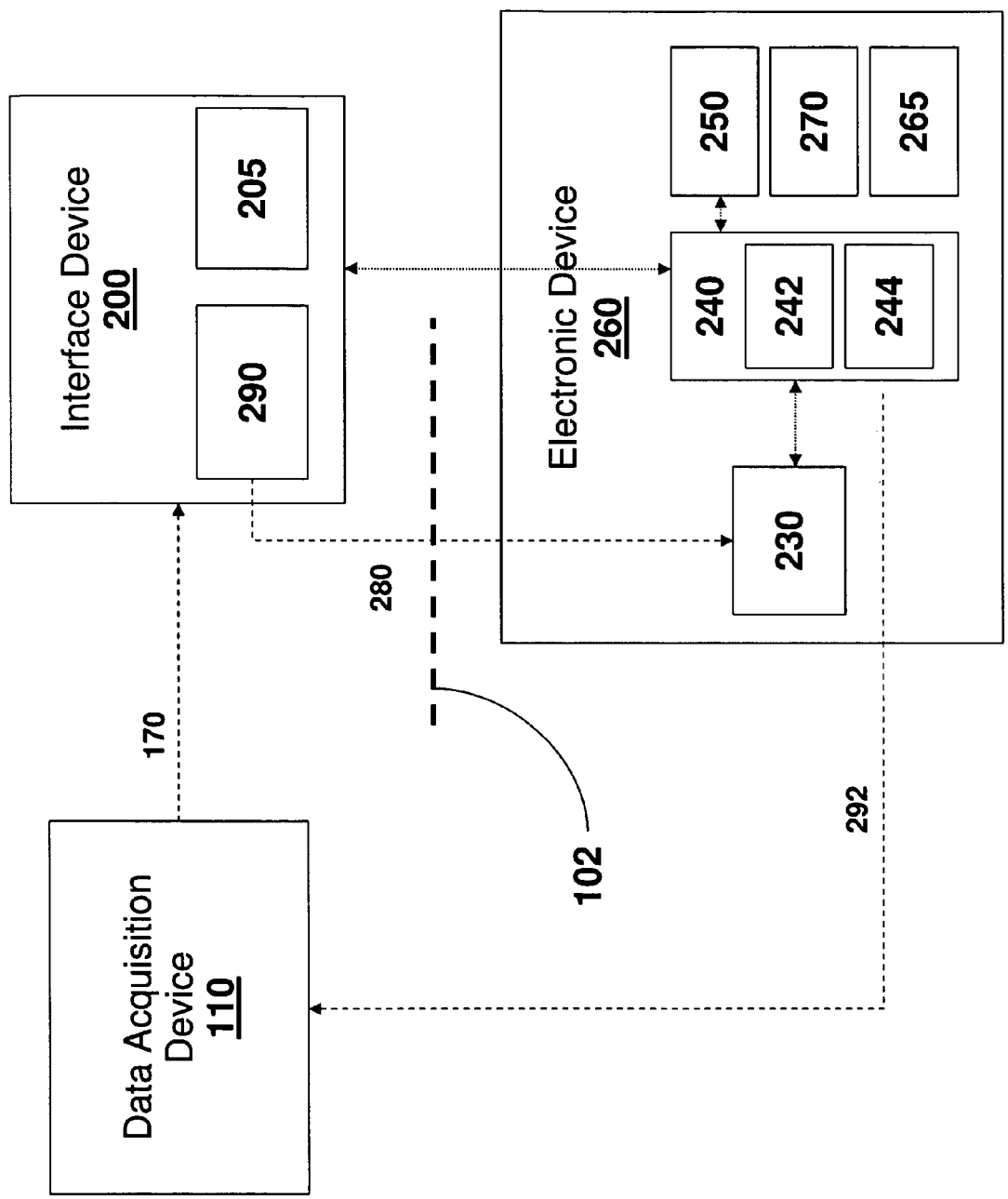
FIG. 2 depicts an exemplary embodiment of the Real Time Data Interface (RTDI) architecture according to the present disclosure.

In FIG. 2, a Real Time Data Interface (RTDI) 290 is depicted. The RTDI 290 is configured, programmed, or both, to contain the logic to control a data acquisition device 110, as well as the interface logic for managing and storing data 280, with minimal buffering, into memory 230 associated with an electronic device 260 operating with a non-real time OS.

The data acquisition device 110 may be any device that acquires data. The data acquisition device 110 may be electronic, and may include one or more sensors for acquiring data. Examples of a data acquisition device 110 include (but are not limited to) an electroencephalography (EEG) device, an electrocardiography (ECG or EKG) device, an echocardiogram (ECHO) device, a voltage sensor, a strain gauge, an accelerometer, a counter, or a multifunction data acquisition device. In one exemplary embodiment, the data acquisition device is a medical device. The data acquisition device 110 may also be a custom device that acquires data.

The data acquisition device 110 may acquire one or more channels of data. Each channel may correspond to an input into a particular sensor. Alternatively, a single sensor may receive or output multiple data channels. Each channel may receive or output data at a certain time instance, or only a subset of the channels may receive or output data at that time instance. The data acquisition device 110 may acquire data for each channel at each time instance. In one embodiment, the data acquisition device 110 acquires data from 32 channels.

The rate or frequency at which the data acquisition device 110 collects data is known as the sample rate. The sample rate indicates, for example, how many times per second the inputs are sampled to acquire data by the data acquisition device 110. For example, a data acquisition device may sample data 100 times per second, 200 times per second, 400 times per second, or 1000 times per second. Alternatively, the sample rate may be a power of two, such as 128 samples per second, 512 samples per second, 1024 samples per second, etc. The possible sample rates may be limited by the data acquisition device 110.

Any sample rate may be utilized, and the sample rate selected may depend on the particular application. For example, an EEG device may operate at 200 samples per second for basic tasks, and may operate at 1000 samples per second for more advanced tasks. A higher sample rate provides more data over the same period of time, which may allow for better data resolution. A lower sample rate requires less memory to store the data. The sample rate may be manually set by a user, or may be automatically configured by data acquisition device 110, RTDI 290, interface device 200, electronic device 260, or by another device, such as a personal computer. The sample rate may vary during data acquisition, or may remain static throughout data acquisition.

In one embodiment, the interface device 200 is a Field Programmable Gate Array (FPGA). In another embodiment, the RTDI 290 is implemented within an Application Specific Integrated Circuit or an Application Specific Processor. In yet another embodiment, the RTDI 290 may be implemented in another custom-designed electronic device.

The data acquisition device 110 may provide data 170 directly to the RTDI 290 or indirectly through the interface device 200 via a receiver or another interface 205. The interface 205 may be a wireless interface for wirelessly receiving or transmitting signals or a wired interface. The interface 205 may send and receive data using, for example, radio signals, fiber optic cables, copper cables, lasers, phone lines, or infrared. The interface 205 may be a USB interface, an Ethernet interface, a Bluetooth interface, a Firewire interface, a GSM radio interface, or a modem. The interface 205 may employ a transfer protocol, such as HTTP, FTP, or a streaming protocol, such as RTP or RTSP. Data 170 may be transmitted from the data acquisition device 110 to the RTDI 290 through a network, such as a Local Area Network (LAN), a Metropolitan Area Network (MAN), a Wide Area Network (WAN), a WiFi network, a Content Distribution (CDMA) network. The interface 205 and transfer protocol may also be custom designed, depending on the application.

The interface device 200 may also include an augmented interface bus with additional channel control logic. The interface bus may provide support for an external signal input. The interface device 200 may provide interface augmentation, which may include increased speed and a deterministic means of extracting data from data acquisition devices that support a standard interface bus.

In one embodiment, the RTDI 290 communicates with the electronic device 260. The electronic device 260 may process data from the data acquisition device 110. The electronic device 260 may be used for an embedded system design. The electronic device 260 may be, for example, a controller or microcontroller, a user device such as a cell phone or PDA, a computer such as a personal computer, mainframe computer, or server, a signal processor, an electronic control unit, a programmable logic controller, an integrated circuit, or a custom-designed device.

The electronic device 260 may include a processing unit 240, a display unit 250, and a memory or storage unit 230. The electronic device 260 may include an interface 270 for interfacing with other electronic devices via the Internet or other network for distributed computing of data amongst a plurality of electronic devices.

Processing unit 240 may include a single processor, or may include multiple processors. Each of the processors in processing unit 240 may include one or more cores. Processors include Central Processing Units (CPUs) such as an "x86" processor, digital signal processors (DSPs), a data processor, a coprocessor, a graphics processor, an ARM processor, or a custom designed processor. In one exemplary embodiment, the processing unit 240 includes a first processor 242 for processing data and a second processor 244 for controlling the data acquisition device 110. In a further embodiment, first processor 242 is a digital signal processor and second processor 244 is a RISC Machine, such as an Advanced RISC Machine (ARM).

The first processor 242 may process data stored in the memory or storage unit 230. For example, the first processor 242 may apply a transform to the data, filter the data or perform other signal processing on the data received from the RTDI 290. The first processor 242 may then optionally display the results of the processing on the display unit 250, or store the results in the memory or storage unit 230.

The second processor 244 may send instructions 292 to the data acquisition device 110 to control the data acquisition device 110. In an illustrative embodiment, the channel dwell pattern, acquisition frequency, and scan pattern of the data acquisition device 110 are all controlled by the second processor 244. In another embodiment, these aspects of the data acquisition device are controlled by the RTDI 290. Control registers are exposed to, or available for manipulation by, the electronic device 260 to which the RTDI 290 is interfaced such that the electronic device 260 can set the parameters within the RTDI 290. These parameters control the scanning and data acquisition patterns of the data acquisition device 110.

According to another embodiment, the processor 240 may be a distributed processor. The processor 240 may include multiple cores, or may include multiple processors on different computers linked together by one or more networks.

The display unit 250 may be any device for presenting information to a user. For example, display unit 250 may be a computer monitor, a printer, an LCD screen, or a speaker.

Memory 230 may be a device for storing data. In addition to storing data, the memory 230 may store instructions or computer code for operating the controller, applications, an OS, and other information. The memory may be an electronic device readable storage medium. Examples of memory 230 include (but are not limited to) RAM, ROM, hard drives, DVDs, CDs, floppy disks, tape drives, registers, punch cards, a USB storage device, on-chip cache, cartridges, optical disks, magneto-optical disks, floating gate transistors, and solid state drives.

The RTDI 290 may communicate directly with a system bus of the electronic device 260, or may communicate with the electronic device 260 indirectly through an interface 265. The RTDI 290 may interface with the electronic device 260 through any of the methods described above in relation to the data acquisition device 110 to RTDI 290 interface 205.

The interface 265 may be a wireless interface for wirelessly receiving or transmitting signals or a wired interface. The interface 265 may send and receive data using, for example, radio signals, fiber optic cables, copper cables, lasers, phone lines, or infrared. The interface 265 may be a USB interface, an Ethernet interface, a Bluetooth interface, a Firewire interface, a GSM radio interface, or a modem. The interface 265 may employ a transfer protocol, such as HTTP, FTP, or a streaming protocol, such as RTP or RTSP. The interface 265 and transfer protocol may also be custom designed, depending on the application.

In the illustrative embodiment, the data is transferred from the RTDI 290 to the internal memory 230 of the electronic device 260 with Direct Memory Access (DMA). DMA is used to write the data into the electronic device's memory 230 independently from action taken by an OS that is running on that electronic device 260. A software driver is interfaced with the controller's OS which interfaces between any application running on the electronic device 260 and the RTDI 290. The software works with the RTDI 290 so that the application that is running on the electronic device 260 can apply real time digital processing to the data 280 as it is transferred to the electronic device's memory 230.

In one embodiment, the RTDI 290 is capable of operating independently from the electronic device 260 and its OS. The RTDI 290 may be programmable or configurable.

According to another embodiment, the RTDI 290 implements interface augmentation to improve the deterministic means and speed of acquisition. The RTDI 290 may implement interface augmentation by providing control logic to support signal input. In some embodiments, the RTDI 290 may provide precisely timed outputs in order to switch on or off, or control, additional components to support or alter the measured inputs. Additionally, the output may be used as an external stimulus or control signal.

According to yet another embodiment, the RTDI 290 can be configured by the electronic device 260 to which it is interfaced.

According to another embodiment, the interface device 200 is realized as a Field Programmable Gate Array. According to yet another embodiment, the system can be integrated into a controller architecture as an intelligent real time data peripheral controller.

By sending data 280 to a non-real-time system in a real-time manner, the non-real time system can continue the processing of the data 280 either in near real time, or it can store the data 280 for later processing. This later processing can be done with varying degrees of sophistication without concern for the real time arrival of the data.

In an illustrative embodiment, a driver of the RTDI 290 brings in one unit of data 170 at a time. Each unit of data 170 may be any configuration and size of data, as described above, including (but not limited to) one or more samples, words, records, blocks, frames, or packets of data. For example, the data acquisition device may sample each channel 10 times before data is sent to the RTDI 290. If the data acquisition device samples 32 channels, this may result in 320 samples being sent to the RTDI 290 (32 channels sampled 10 times). However, each channel need not be sampled at every time instance. Alternatively, the data acquisition device may send data 170 to the RTDI 290 one channel at a time.

While one unit of data 170 is received, the unit of data that just arrived can be processed (280). The units of data 280 sent from the RTDI 290 to the electronic device 260 may be the same size or configuration as the units of data 170 received from the data acquisition device, or the units of data 280 may be different than the units of data 170. For example, the RTDI 290 may package smaller units of data 170 into larger units of data 280. Optionally, the RTDI 290 may perform some digital processing on the data 170 before the data 170 is forwarded to the controller 260. For example, the RTDI 290 may perform filtering or preprocessing of the data.

Since data 170 is not generally lost, and since the data 170 is continuously being acquired and received, the electronic device 260 can implement real time processing even though it is not responsible for guaranteeing the deterministic arrival of the data, which is handled by the RTDI 290.

"Streaming," as used herein, means that on each clock cycle which is synchronized with the sampling rate, one new data unit is introduced into the processing pipeline and one new processed data unit is produced ready to be sent on for additional processing or storage in memory 230. The clock cycle may be measured from any point in the cycle such as the rising or falling edge of the clock signal, the leading or trailing edge of the clock signal, or any of the phases of a clock signal. Even though the data arrives in units such as blocks, a streaming algorithm can be implemented as though one data element is arriving at a time.

As discussed herein the data 170 and the data 280 represents a physical property of a cell, an extracellular matrix or tissue. For example, the data 170 and the data 280 can represent an electrophysiological reading of the heart, the brain, the cerebral cortex, muscles, eyes, retina and olfactory receptors. Additionally, the data 170 and the data 280 may produced in a two or three dimensional format, such as a two dimensional field or three dimensional data structure.

Figure 3:
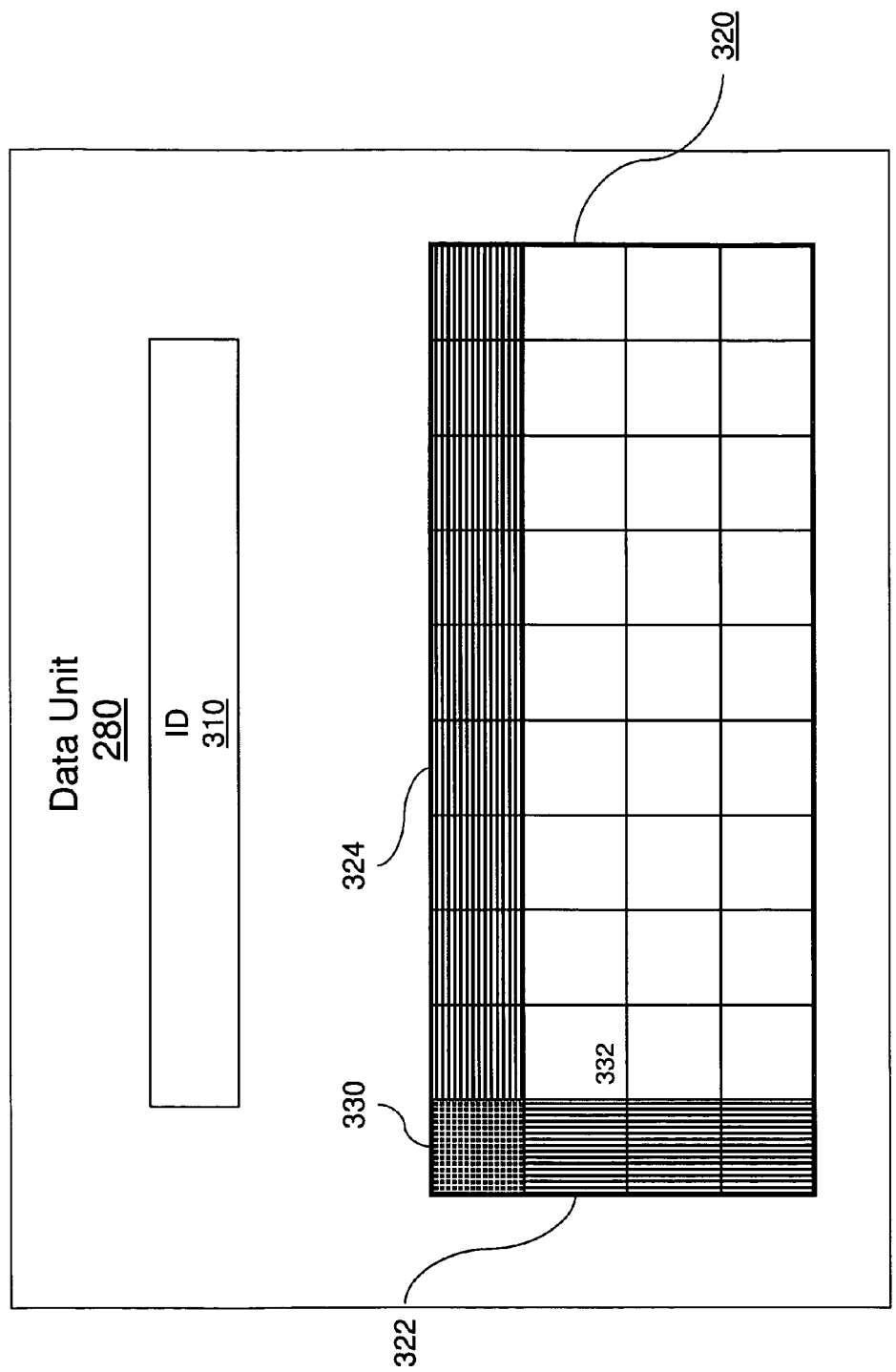
FIG. 3 depicts a data packet suitable for use with exemplary embodiments of the present disclosure.

In one embodiment, as depicted in FIG. 3, the RTDI 290 may optionally associate an identification tag 310 with a unit of data 280. The identification tag may be, for example, a 32-bit ID tag, although tags of other sizes may also be used. The size of the ID tag may be selected based on the application. For example, in a situation in which the data acquisition device 110 samples data at a high rate, a large ID tag may be selected to ensure that each unit of data may receive a unique tag (until all tags have been used and "roll over" back to the initial ID).

When the block of data 280 arrives at the electronic device 260, the electronic device 260 may perform data integrity assurance by checking the unit of data to ensure that the ID tag 310 identifies the unit of data as expected by the electronic device 260. For example, the electronic device 260 may receive a block of data with an ID tag of n, and subsequently receive a block of data with an ID tag of n+1. The sequential nature of the ID tags may indicate that (1) the units of data have arrived in the correct order and (2) no data has been lost. If, on the other hand, the electronic device 260 received a first unit of data having a first ID tag of n, and a second unit of data having a second ID tag of n+2, this may indicate to the controller that a unit of data having an ID tag of n+1 has been lost or delayed in transmission.

The electronic device 260 may handle a lost or delayed unit of data in a variety of ways, depending on the application. For example, the electronic device 260 may ignore the error, or may log the error and cause the data acquisition process to stop. An error message may be displayed to a user. According to one embodiment, the electronic device 260 may extrapolate the missing data, for example by averaging the data that arrived before the missing unit and the data that arrived after the missing unit. Alternatively, the electronic device 260 may request that the RTDI 290 retransmit the missing data unit.

The use of the ID tag 310 allows data to arrive at the electronic device 260 nonsequentially, and, in turn, to be reassembled at the electronic device 260 in the correct order. This may be especially useful if the RTDI 290 communicates with the electronic device 260 over a network, such as the Internet. The electronic device 260 may employ a protocol in order to ensure that all expected data arrives and is assembled in the correct order. An example of such a protocol is the sliding window protocol, which is a data transmission protocol used in the data link layer of the OSI model. The sliding window protocol allows a source to send a specified number of data units before the data units' receipt at the destination is received. When acknowledgement is received for one or more units of data, the "window" of transmittable units advances or "slides," allowing more units to be transmitted. One having ordinary skill in the art will recognize that the sliding window protocol is exemplary, and any suitable protocol may be selected.

Another use for the ID tag 310 is to ensure the integrity of data when the transmission of data to the electronic device 260 is interrupted. For example, if RTDI 290 transmits data wirelessly to electronic device 260, the transmission may be blocked due to an obstacle that moves into the transmission path, or may be interrupted if the signal from RTDI 290 becomes too weak to reach electronic device 260. In this case, the controller may not receive one or more packets of data. Because the data may be temporarily buffered at RTDI 290, the electronic device 260 may request any missing data when the electronic device 260 is once again able to receive transmissions from RTDI 290. For example, the electronic device 260 may note the ID of the last packet received (e.g., packet ID n) before the transmission was interrupted, and the first packet received (e.g., packet ID n+10) when the transmission resumed. The electronic device 260 can then request the missing data (e.g., packets n+1 through n+9) from the RTDI 290. Data may continue to stream while the RTDI 290 transmits the missing data to the electronic device 260. The missing data may be transmitted alongside current data by increasing the throughput of data transfer between the RTDI 290 and the electronic device 260.

In addition to the ID tag 310, the data unit 280 may also include the data 320 acquired by the data acquisition device 110. As noted above, this data 320 may be preprocessed by the RTDI 290. The data in the example illustrated in FIG. 3 consists of four rows and ten columns of data. Each box within the grid indicates one sample. The rows may indicate, for example, different channels sampled by the data acquisition device 110. Accordingly, row 324 may represent data from a first channel of the data acquisition device. The columns may indicate, for example, different sample times. Accordingly, column 322 may represent the data acquired for each channel at a first sample time. Each column designates a "word" or a "record," which is a collection of one sample for each channel at a particular sample time.

In light of this convention, column 322 constitutes a first record in data set 320. Data unit 280 may contain data from the first channel of the data acquisition device 110 at a first sample time. Box 332 contains data from a second channel of the data acquisition device 110 at a second sample time. The particular configuration depicted in FIG. 3 is merely one example of a data unit, and other configurations may be chosen depending on the application.

Figure 4:
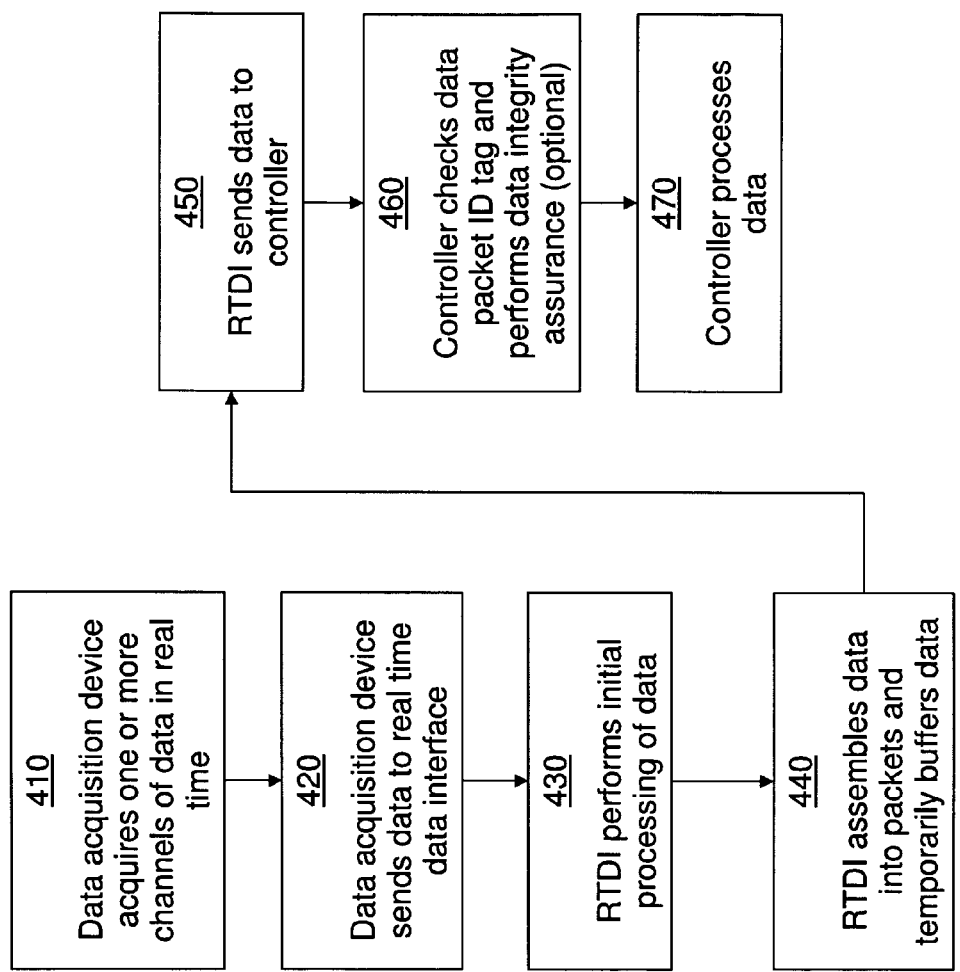
FIG. 4 is a flowchart depicting an exemplary process carried out in accordance with the teachings of the present disclosure.

FIG. 4 depicts a flow chart describing the steps performed according to an exemplary embodiment of the invention. At step 410, the data acquisition device 110 acquires data in real-time or near real-time. As described above, the data acquisition device 110 may acquire one or more channels of data at each time instance.

At step 420, data is transmitted from the data acquisition device 110 to the RTDI 290. Each data unit may be transmitted individually, or multiple data units may be packaged together as a single data unit by the data acquisition device 110.

At step 430, the RTDI 290 may perform preprocessing or filtering on the data. At step 440, the RTDI 290 may assemble the data into packets and temporarily buffer the data. The RTDI 290 may buffer the data for a period of time corresponding to the maximum amount of time that the RTDI 290 may buffer data, for example due to the limitations of the memory or storage of the FPGA 200, or the RTDI 290 may buffer the data for a predetermined period of time. For example, the predetermined period of time may correspond to a period of time in which the processor 240 may make a determination as to whether transmitted data has been lost, and request any data determined to be missing. Alternatively, the RTDI 290 and the electronic device 260 may employ an acknowledgement system acknowledging when data has been received by electronic device 260. Once data has been acknowledged as received, the RTDI 290 may remove the data from the RTDI 290's buffer.

The data may be assembled into packets of the same size, larger, or smaller than the packets transmitted from the data acquisition device 110 to the RTDI 290. For example, multiple packets may be packaged into a single larger packet for ease of transmission. At step 440, the RTDI 290 may add an ID tag to the data packet.

At step 450, the RTDI sends the assembled data pack to the controller 260. Optionally, at step 460, the electronic device 260 performs data integrity assurance on the received data unit to ensure that data was not lost or arrived out of sequence. At step 470, the electronic device 260 reassembles the data and performs processing on the data.

Figure 5B:
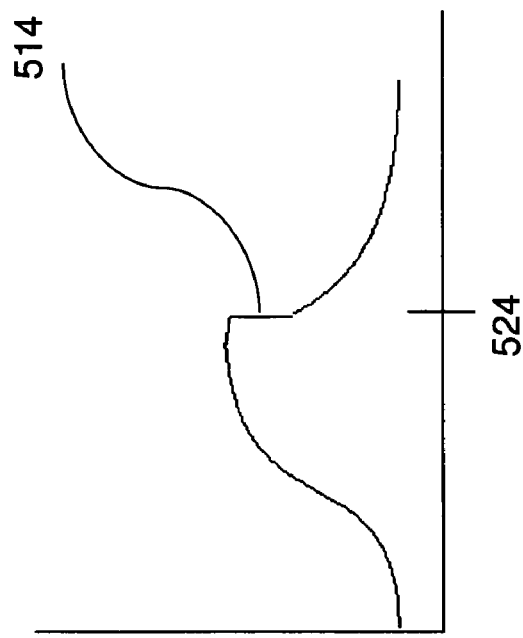
FIG. 5B is an example of the data set of FIG. 5A as processed by a conventional device.
Figure 5A:
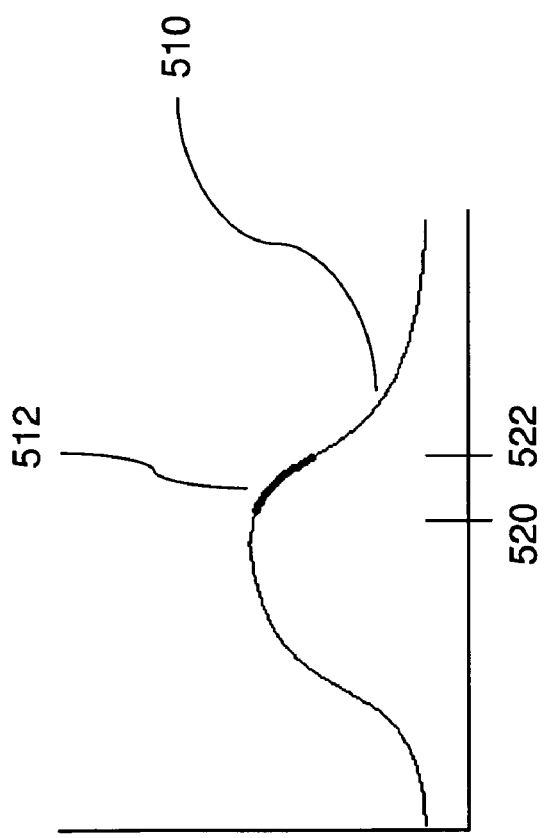
FIG. 5A is an example of a data set representing a phenomenon.

One consequence of the structures, functions and operations described herein is that more accurate results are obtained due to the timing of data received by and processed by the processor 240. That is, the real-time or near real-time acquisition, intermediate processing by the RTDI 290 and the processing by the processor 240 improves the timing of processing the data representing the physical phenomena, which, in turn, improves the results of the processed data as compared to processing the same data without the RTDI 290. A further consequence of the structures, functions and operations described herein is a reduction or elimination of errors associated with lost data, or data that arrives out of sequence. For example, FIG. 5A depicts a data set representing a phenomenon measured over a period of time. FIG. 5A depicts a substantially smooth data curve 510, which could represent, for example, a car's velocity over a period of time. FIG. 5A depicts an optimal curve without measurement errors. Curve 510 includes shaded region 512, which represents the data collected between time 520 and time 522.

Due to the problems with conventional systems, as discussed above, data may be lost or misplaced in the data set. FIG. 5B depicts the data represented by curve 510 as measured and processed by a conventional data acquisition and processing system experiencing a degree of data loss.

At time 520, the data acquisition device 110 acquires the data, as represented in curve 510 of FIG. 5A. The data acquisition device 110 continues to acquire data at time 522. As noted above, in a conventional device, this data (acquired in real time) may need to cross the real-time/non-real-time boundary 102 in order to be processed by a non-real time processor.

However, because the processing of the data must compete with other processes taking place on the processor 240, and because the processor 240 does not request additional data until processing of the current batch of data has taken place, some data may be lost. In the present example, the processor 240 receives a batch of data acquired by the data acquisition device 110 at time 520, and processes it. Processing the data takes the processor 240 until time 522, when the processor 240 requests the next batch of data. However, in this time period, the data acquisition device 110 may have acquired additional data that it has already discarded (represented by shaded region 512). The data may be discarded, for example, due to a lack of storage space on the data acquisition device 110 for buffering data.

As a result, the processor 240 receives the next batch of data, representing time 522, and is missing the data from region 512. Thus, a graphical representation of data of processed by the processor 240 may look like curve 514 in FIG. 5B. At time 524, the underlying data has been lost, unbeknownst to the processor 240. Even if the processor 240 were to recognize that some data is missing, the conventional system does not have the capability to identify how much data is missing or what the missing data ought to look like.

Accordingly, the processor 240 processes data represented by the curve 514, which may give different results than would have occurred had the processor 240 processed data represented by curve 510. Curve 510 represents the actual phenomenon, as measured by the data acquisition device, while curve 514 represents data loss that results from the loss of data related to area 512.

Figure 6:
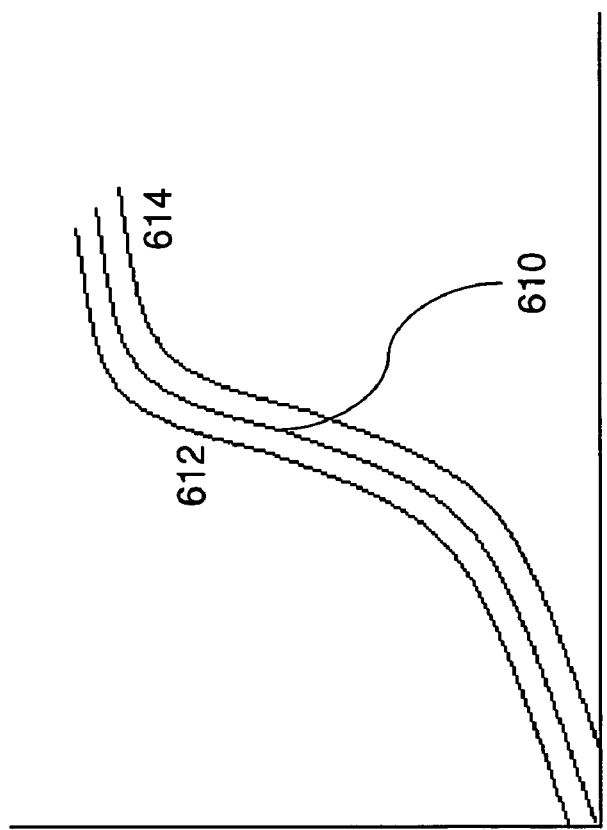
FIG. 6 depicts an example of a phenomenon with measurement jitter.

An unexpected consequence of the methods described above is the reduction or elimination of errors due to data jitter. Due to the nature of the data acquisition and processing methodologies described above, the algorithms that process the data afford more accurate results. An exemplary phenomenon measured with a degree of data jitter is depicted in FIG. 6. Curve 610 represents the phenomenon itself. However, due to the nature of signal processing, the measured curve 610 may be obscured by a degree of jitter. For example, the measurement may be associated with some degree of noise, represented by the upper bound 612 and the lower bound 614. The measured data points may fall somewhere between bounds 612 and 614. In a conventional system, it may be difficult or impossible to recognize or remove the measurement jitter. However, the present system yields a more accurate representation of the jitter, which can be accounted for and eliminated or reduced.

By providing the RTDI 290, the present invention eases the data transition over the real-time/non-real-time barrier, and thus provides a more accurate result, even in the presence of jitter. Further, data loss can be substantially reduced or eliminated. As a result, data integrity may be improved and results may be more accurate than with conventional systems.

The present invention may be particularly useful in waveform intensive applications that involve substantial data processing. Examples of applications that may particularly benefit from the methods described herein are prevalent in the industrial and medical fields, and may involve test instrumentation, pattern recognition, and data filtering. However, the present invention is not so limited, and may be employed whenever data acquired from a real-time or near-real-time data acquisition device is processed.

Although the present invention has been described with reference to particular embodiments, the present invention is not so limited. One having ordinary skill in the art will recognize numerous modifications that can be made without departing from the scope of the invention. The claims are intended to cover the exemplary embodiments described herein as well as alternative embodiments.

What is claimed is:

1. A system for controlling a data acquisition device and providing acquired data to an electronic device, comprising:
    a data acquisition device for acquiring one or more units of data in real time; and
    an interface device for controlling receipt of data from the data acquisition device, the interface device providing an interface between real time data acquisition and a non-real time operating system on the electronic device;
    wherein the interface device controls the sending of the one or more units of data to the electronic device in a real time manner by providing the one or more units of data to a memory of the electronic device independent of a request for the data by the electronic device; and wherein the interface device is configured by the electronic device.

2. The system of claim 1, wherein the interface device is capable of operating independently from the electronic device and its operating system.

3. The system of claim 1, wherein the interface device is programmable or configurable.

4. The system of claim 1, wherein the interface device implements interface augmentation to improve the deterministic means and speed of acquisition.

5. The system of claim 1, wherein the interface device is a Field Programmable Gate Array.

6. The system of claim 1, wherein the system is integrated into a controller architecture as an intelligent real time data peripheral controller.

7. A method of processing data, the method comprising:
acquiring data in real time with a data acquisition device;
transmitting the data from the data acquisition device to an interface device;
transmitting the data in a real time manner from the interface device to a memory of a non-real time processing device, wherein the data is transmitted from the interface device to a memory of the non-real time processing device independently of a request for data by the non-real time processing device; and
configuring the interface device using the non-real time processing device.

8. The method of claim 7, wherein the processing device performs data integrity assurance.

9. The method of claim 7, wherein the data that is transmitted from the data interface device to the processing device comprises an identification tag.

10. The method of claim 7, wherein the processing device transmits instructions to the data acquisition device for controlling the data acquisition device.

11. The method of claim 7, wherein the interface device inserts data into a memory of the processing device.

12. The method of claim 11, wherein interface device waits for an acknowledgement that a unit of data has been received at the processing device before transmitting a further unit of data.

13. The method of claim 7, wherein the interface device performs preprocessing or filtering on the data before transmitting the data to the processing device.

14. The method of claim 7, wherein the interface device substantially reduces or eliminates inaccuracy due to transmitting data having jitter in a real time manner from the interface device to the non-real time processing device.

15. The method of claim 7, wherein the interface device temporarily buffers the data.

16. The method of claim 15, wherein the interface device buffers the data for a predetermined period of time corresponding to a period of time sufficient for the processing device to determine whether data has been lost and request the lost data from the data interface device.

17. The method of claim 7, wherein the data acquisition device is a medical device.

18. The method of claim 17, wherein the data acquisition device is an ECG device.

* * * * *